US012672146B2

(12) United States Patent
Su et al.

(10) Patent No.: US 12,672,146 B2
(45) Date of Patent: Jun. 30, 2026

(54) METHOD AND DEVICE FOR TRANSMITTING CONTROL INFORMATION

(71) Applicant: DATANG MOBILE COMMUNICATIONS EQUIPMENT CO., LTD., Beijing (CN)

(72) Inventors: Xin Su, Beijing (CN); Xueyuan Gao, Beijing (CN); Mengjun Wang, Beijing (CN); Qiubin Gao, Beijing (CN); Lei Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 396 days.

(21) Appl. No.: 17/799,684

(22) PCT Filed: Nov. 26, 2020

(86) PCT No.: PCT/CN2020/131900
§ 371 (c)(1),
(2) Date: Aug. 14, 2022

(87) PCT Pub. No.: WO2021/159809
PCT Pub. Date: Aug. 19, 2021

(65) Prior Publication Data
US 2023/0062005 A1      Mar. 2, 2023

(30) Foreign Application Priority Data
Feb. 14, 2020    (CN) .......................... 202010093292.3

(51) Int. Cl.
*H04W 72/23*        (2023.01)
(52) U.S. Cl.
CPC .................................. *H04W 72/23* (2023.01)

(58) Field of Classification Search
CPC .... H04L 5/0023; H04L 5/0053; H04W 72/23; H04B 7/0695
See application file for complete search history.

(56) References Cited

U.S. PATENT DOCUMENTS

| | | | |
|---|---|---|---|
| 12,219,579 B2 * | 2/2025 | Kim ........................ | H04L 25/02 |
| 2018/0220398 A1 | 8/2018 | John Wilson et al. | |

(Continued)

FOREIGN PATENT DOCUMENTS

| | | |
|---|---|---|
| CN | 104811263 A | 7/2015 |
| CN | 110474751 A | 11/2019 |
| CN | 110536451 A | 12/2019 |
| WO | 2018228487 A1 | 12/2018 |
| WO | 2019019057 A1 | 1/2019 |

(Continued)

OTHER PUBLICATIONS

Ericsson, "On multi-TRP and multi-panel", 3GPP TSG RAN WG1 Meeting RAN1#96-bis, Xi'an, China, Apr. 8-12, 2019, total 18 pages, R1-1904750.

(Continued)

*Primary Examiner* — Sulaiman Nooristany
(74) *Attorney, Agent, or Firm* — KILPATRICK TOWNSEND & STOCKTON LLP

(57)        ABSTRACT
Provided in embodiments of the present disclosure are a method and device for transmitting control information. In an embodiment of the present disclosure, the method includes a base station determining to repeatedly transmit DCI; and the base station repeatedly causing the DCI to be carried on at least two PDCCHs used for repeated DCI transmission, and transmitting same. When a terminal is unable to successfully detect some of PDCCHs for repeated DCI transmission due to a blockage or interference, the terminal can still perform detection on the remaining PDCCHs to obtain DCI, to enhance the reliability of DCI transmission.

8 Claims, 4 Drawing Sheets

(56) References Cited

U.S. PATENT DOCUMENTS

| | | | |
|---|---|---|---|
| 2019/0020506 A1 | 1/2019 | Cheng et al. | |
| 2020/0008235 A1 | 1/2020 | Sarkis et al. | |
| 2020/0052857 A1 | 2/2020 | Xu et al. | |
| 2020/0100223 A1* | 3/2020 | Park | H04L 5/10 |

FOREIGN PATENT DOCUMENTS

| | | | |
|---|---|---|---|
| WO | 2019139955 A1 | 7/2019 | |
| WO | 2019227404 A1 | 12/2019 | |
| WO | 2019244218 A1 | 12/2019 | |

OTHER PUBLICATIONS

CATT, "Discussion on enhancements on multi-TRP/panel for PDCCH, PUCCH and PUSCH", 3GPP TSG RAN WG1 Meeting #102e, e-Meeting, Aug. 17-28, 2020, total 10 pages, R1-2005684.

LG Electronics, "Discussion on PDCCH repetition for URLLC", 3GPP TSG RAN WG1 Meeting #92bis, Sanya, China, Apr. 16-20, 2018, total 4 pages, R1-1804571.

Motorola Mobility et al., "Potential PDCCH enhancements for URLLC operation", 3GPP TSG RAN WG1 Meeting #95, Spokane, USA, Nov. 12-16, 2018, total 3 pages, R1-1813353.

Huawei et al., "Reliability/robustness enhancement with multi-TRP/panel", 3GPP TSG RAN WG1 meeting #96b, Xi'an, China, Apr. 8-12, 2019, total 10 pages, R1-1903983.

The office action received in counterpart Korea application No. 10-2022-7028953, mailed on Dec. 17, 2024.

NTT DOCOMO, Inc, "Enhancements on multi-TRP/panel transmission", 3GPP TSG RAN WG1 #98bis, Chongqing, China, Oct. 14-20, 2019, total 32 pages, R1-1911184.

Ericsson, "Finalizing issues for mTRP", 3GPP TSG-RAN WG1 Meeting #99, Reno, USA, Nov. 18-22, 2019, total 15 pages, R1-1912656.

* cited by examiner

METHOD AND DEVICE FOR TRANSMITTING CONTROL INFORMATION

CROSS-REFERENCE OF RELATED APPLICATIONS

The present application is a National Stage of International Application No. PCT/CN2020/131900, filed on Nov. 26, 2020, which claims the priority from Chinese Patent Application No. 202010093292.3, filed with the Chinese Patent Office on Feb. 14, 2020 and entitled "Control Information Transmission Method and Device", both of which are hereby incorporated by reference in their entireties.

FIELD

The present application relates to the field of communication technologies, and particularly to a control information transmission method and device.

BACKGROUND

In an NR (New Ratio) system, in order to improve the cell edge coverage and provide the more balanced service quality within a service area, the multi-point cooperation is a means. From the perspective of network morphology, the network deployment with a large number of distributed transmission and reception points plus centralized baseband processing will be more conducive to providing a balanced user experience rate, and significantly reduce the delay and signaling overhead caused by trans-regional handover. With the increase of frequency bands, the relatively dense deployment of transmission and reception points is also required from the perspective of ensuring the network coverage. In a high frequency band, with the increase of the integration degree of the active antenna equipment, it will be more inclined to use a modular active antenna array. Each antenna array of transmission and reception points can be divided into several relatively independent antenna panels, so the shape of the entire array and the number of ports can be flexibly adjusted according to the deployment scenario and service requirements. The antenna panels or transmission and reception points can be connected by light for the more flexible distributed deployment.

In the millimeter wave band, as the wavelength decreases, the blocking effect caused by obstacles such as human bodies or vehicles will become more pronounced. Therefore, how to reduce the blocking effect to enhance the reliability of the control information transmission is an urgent problem to be solved at present.

BRIEF SUMMARY

Embodiments of the present application provide a control information transmission method and device, to enhance the reliability of the control information transmission.

In one embodiment of the present application provides a method for transmitting control information, including:

determining, by a base station, to perform repeated transmission of Downlink Control Information (DCI);

transmitting, by the base station, the DCI by carrying the DCI repeatedly on at least two Physical Downlink Control Channels (PDCCHs) used for repeatedly transmitting DCI to send the DCI.

In one embodiment, the at least two PDCCHs used for repeatedly transmitting DCI are from N PDCCH candidates of at least two Control Resource Sets (CORESETs); where each of the N PDCCH candidates corresponds to a Transmission Configuration Indicator state (TCI state), and N is an integer greater than 1.

In one embodiment, the DCI sent by at least one of the at least two PDCCHs includes repeated-transmission-resource indication information used to indicate other PDCCH that repeatedly transmits the DCI in at least two PDCCHs or related information of the other PDCCH.

In one embodiment, the related information of the other PDCCH indicated by the repeated-transmission-resource indication information includes at least one of:

a TCI state of a CORESET to which the other PDCCH belongs;

a PDCCH candidate to which the other PDCCH belongs;

a Search Space (SS) to which the other PDCCH belongs;

a CORESET to which the other PDCCH belongs; or an aggregation level of the other PDCCH.

In one embodiment, the method further includes:

sending, by the base station, an association relationship between transmission resources or a rule for determining the association relationship between transmission resources to a terminal through a high-layer signaling; where the association relationship is an association relationship between transmission resources used for repeatedly transmitting DCI, and the association relationship between transmission resources includes an association relationship between PDCCHs used for repeatedly transmitting DCI or an association relationship between at least one kind of related information of PDCCHs used for repeatedly transmitting DCI.

In one embodiment, the method further includes:

sending, by the base station, a configuration parameter used by a rule for determining an association relationship between transmission resources to a terminal through a high-layer signaling; where the association relationship is an association relationship between transmission resources used for repeatedly transmitting DCI, and the association relationship between transmission resources includes an association relationship between PDCCHs used for repeatedly transmitting DCI or an association relationship between at least one kind of related information of PDCCHs used for repeatedly transmitting DCI.

In one embodiment, the base station pre-agrees with a terminal on at least one of:

an association relationship between transmission resources;

a rule for determining the association relationship between transmission resources; or a configuration parameter used by the rule for determining the association relationship between transmission resources;

where the association relationship is an association relationship between transmission resources used for repeatedly transmitting DCI, and the association relationship between transmission resources includes an association relationship between PDCCHs used for repeatedly transmitting DCI or an association relationship between related information of PDCCHs used for repeatedly transmitting DCI.

In one embodiment, the at least one association relationship includes at least one of:

an association relationship between TCI states of CORESETs to which the PDCCHs used for repeatedly transmitting DCI belong;

an association relationship between PDCCH candidates to which the PDCCHs used for repeatedly transmitting DCI belong;

an association relationship between search spaces to which the PDCCHs used for repeatedly transmitting DCI belong;

an association relationship between CORESETs to which the PDCCHs used for repeatedly transmitting DCI belong; or an association relationship between aggregation levels of the PDCCHs used for repeatedly transmitting DCI.

In one embodiment of the present application provides a method for transmitting control information, including:

receiving, by a terminal, DCI sent by a base station, where the DCI is repeatedly carried on at least two PDCCHs used for repeatedly transmitting DCI.

In one embodiment, the method further includes:

receiving the DCI repeatedly transmitted on other PDCCH used for repeated transmission of the DCI if the terminal fails to detect the DCI; otherwise, performing, by the terminal, at least one of:

giving up receiving the DCI repeatedly transmitted on the other PDCCH;

giving up detecting a CORESET for repeatedly transmitting DCI;

giving up detecting a search space for repeatedly transmitting DCI; or giving up detecting PDCCH candidates with a same and/or agreed relationship and/or a specified aggregation level for repeatedly transmitting DCI.

In one embodiment, the at least two PDCCHs used for repeatedly transmitting DCI are from N PDCCH candidates of at least two CORESETs; where each of the N PDCCH candidates corresponds to a TCI state, and N is an integer greater than 1.

In one embodiment, the DCI sent by at least one of the at least two PDCCHs includes repeated-transmission-resource indication information used to indicate other PDCCH that repeatedly transmits the DCI in at least two PDCCHs or related information of the other PDCCH.

In one embodiment, the related information of the other PDCCH indicated by the repeated-transmission-resource indication information includes at least one of:

a TCI state of a CORESET to which the other PDCCH belongs;

a PDCCH candidate to which the other PDCCH belongs;

a search space to which the other PDCCH belongs;

a CORESET to which the other PDCCH belongs; or an aggregation level of the other PDCCH.

In one embodiment, the method further includes:

receiving, by the terminal, an association relationship between transmission resources or a rule for determining the association relationship between transmission resources sent by the base station through a high-layer signaling; where the association relationship is an association relationship between transmission resources used for repeatedly transmitting DCI, and the association relationship between transmission resources includes an association relationship between PDCCHs used for repeatedly transmitting DCI or an association relationship between at least one kind of related information of PDCCHs used for repeatedly transmitting DCI;

the receiving the DCI repeatedly transmitted on other PDCCH used for repeatedly carrying the DCI, includes:

detecting, by the terminal, the other PDCCH at least according to the association relationship between transmission resources or the rule for determining the association relationship between transmission resources, to receive the DCI carried by the other PDCCH.

In one embodiment, the method further includes:

receiving, by the terminal, a configuration parameter used by a rule for determining an association relationship between transmission resources sent by the base station through a high-layer signaling; where the association relationship is an association relationship between transmission resources used for repeatedly transmitting DCI, and the association relationship between transmission resources includes an association relationship between PDCCHs used for repeatedly transmitting DCI or an association relationship between at least one kind of related information of PDCCHs used for repeatedly transmitting DCI;

the receiving the DCI repeatedly transmitted on other PDCCH used for repeatedly carrying the DCI, includes:

determining, by the terminal, the association relationship between transmission resources at least according to the rule for determining the association relationship between transmission resources and the configuration parameter;

detecting, by the terminal, the other PDCCH according to the association relationship, to receive the DCI carried by the other PDCCH.

In one embodiment, the terminal pre-agrees with the base station on at least one of:

an association relationship between transmission resources;

a rule for determining the association relationship between transmission resources; or a configuration parameter used by the rule for determining the association relationship between transmission resources;

where the association relationship is an association relationship between transmission resources used for repeatedly transmitting DCI, and the association relationship between transmission resources includes an association relationship between PDCCHs used for repeatedly transmitting DCI or an association relationship between related information of PDCCHs used for repeatedly transmitting DCI.

In one embodiment, the at least one association relationship includes at least one of:

an association relationship between TCI states of CORESETs to which the PDCCHs used for repeatedly transmitting DCI belong;

an association relationship between PDCCH candidates to which the PDCCHs used for repeatedly transmitting DCI belong;

an association relationship between search spaces to which the PDCCHs used for repeatedly transmitting DCI belong;

an association relationship between CORESETs to which the PDCCHs used for repeatedly transmitting DCI belong; or an association relationship between aggregation levels of the PDCCHs used for repeatedly transmitting DCI.

In one embodiment of the present application provides a base station, which includes:

a processing device: configured to determine to perform repeated transmission of DCI;

a sending device: configured to send the DCI by carrying the DCI repeatedly on at least two PDCCHs used for repeatedly transmitting DCI to send the DCI.

In one embodiment of the present application provides a terminal, which includes:

a receiving device configured to receive DCI sent by a base station, where the DCI is repeatedly carried on at least two PDCCHs used for repeatedly transmitting DCI.

In one embodiment of the present application provides a base station, including: a processor, a memory and a transceiver;

the transceiver is configured to receive and send data under control of the processor;

the memory is configured to store computer instructions;

the processor is configured to read the computer instructions and execute the method according to any one of the embodiments.

In one embodiment of the present application provides a terminal, including: a processor, a memory and a transceiver;

the transceiver is configured to receive and send data under control of the processor;

the memory is configured to store computer instructions;

the processor is configured to read the computer instructions and execute the method according to any one of the embodiments.

In one embodiment of the present application provides a storage medium, where the computer-readable storage medium stores computer-executable instructions that are configured to cause a computer to execute the method according to any one of the embodiemnts.

In one embodiment of the present application provides a storage medium, where the computer-readable storage medium stores computer-executable instructions that are configured to cause a computer to execute the method according to any one of the embodiments.

In the above embodiments of the present application, the base station carries the DCI repeatedly on at least two PDCCHs used for repeatedly transmitting DCI to perform the repeated transmission, improving the reliability of the DCI transmission.

BRIEF DESCRIPTION OF THE DRAWINGS

In order to illustrate the embodiments of the present application more clearly, the accompanying figures which need to be used in describing the embodiments will be introduced below briefly. The accompanying figures described below are only some embodiments of the present application.

DETAILED DESCRIPTION OF THE EMBODIMENTS

In order to illustrate the embodiments of the present application more clearly, the accompanying figures which need to be used in describing the embodiments will be introduced below briefly. The accompanying figures described below are only some embodiments of the present application.

The "plurality" in the embodiments of the present application refers to two or more.

"Terminal" in the embodiments of the present application is also called User Equipment (UE), Mobile Station (MS), Mobile Terminal (MT), etc., and is a device for providing the voice and/or data connectivity to the user, e.g., a handheld device with the wireless connection function, a vehicle-carried device, etc. At present, some examples of the terminal are: mobile phone, tablet, laptop, palmtop computer, Mobile Internet Device (MID), wearable device, Virtual Reality (VR) device, Augmented Reality (AR) equipment, wireless terminal in the industrial control, wireless terminal in the self driving, wireless terminal in the remote medical surgery, and wireless terminal in the smart grid, wireless terminal in the transportation safety, wireless terminal in the smart city, wireless terminal in the smart home, etc.

The "base station" in the embodiments of the present application may be a Radio Access Network (RAN) node or a base station. The RAN is a part in the network that connects the terminal to the wireless network. The RAN node (or device) is a node (or device) in the radio access network, and may also be called base station. At present, some examples of the RAN node are: gNB, Transmission Reception Point (TRP), evolved Node B (eNB), Radio Network Controller (RNC), Node B (NB), Base Station Controller (BSC), Base Transceiver Station (BTS), home base station (for example, home evolved NodeB or Home Node B (HNB)), Base Band Unit (BBU), or Wireless Fidelity (Wifi) Access Point (AP), etc. Furthermore, in a network structure, the RAN may include a Centralized Unit (CU) node and a Distributed Unit (DU) node.

In the NR system, the transmission of downlink control information involves concepts such as control resource set (CORESET), Search Space (SS), Physical Downlink Control Channel (PDCCH) candidate, Control Channel Element (CCE). Here, the CORESET decides the size (such as the number of symbols occupied by PDCCH) and the frequency-domain location (such as frequency band occupied by PDCCH) of available PDCCH time-domain resources. A search space can contain one or more than two CORESETs. The search space can define the serial number of the starting symbol of the PDCCH and the monitoring period of the PDCCH. Each search space consists of a group of PDCCH candidates with same or different aggregation levels. The CCE is the basic logical resource for PDCCH transmission, where the number of CCEs occupied by one PDCCH transmission corresponds to an aggregation level, that is, the numbers of CCEs included in different aggregation levels are different.

Figure 1:
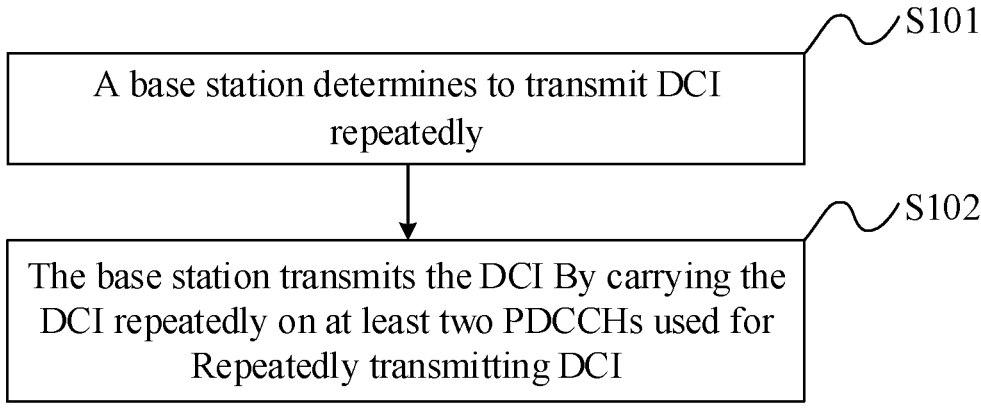
FIG. 1 exemplarily shows a flowchart of a control information transmission method implemented on a base station side according to an embodiment of the present application.

FIG. 1 exemplarily shows a flowchart of a control information transmission method according to an embodiment of the present application. The process includes the following steps.

S101: a base station determines to perform repeated transmission of DCI.

In this step, the base station may pre-agree or configure (for example, through high layer signaling) whether to perform the repeated transmission of the DCI, or determine whether to perform the repeated transmission of the DCI as required. If the DCI needs to be repeatedly transmitted, the repeated transmission is performed according to the following process in the embodiment of the present application; otherwise, the DCI transmission is performed in a conventional manner.

In one embodiment, it can be determined whether the DCI needs to be repeatedly transmitted according to the channel detection situation (for example, when it is detected that the channel quality is poor, it is determined that the DCI needs to be repeatedly transmitted), or it can be determined whether the DCI needs to be repeatedly transmitted according to the feedback of the terminal. The above only exemplarily enumerates several possibilities of whether the DCI needs to be repeatedly transmitted, and the embodiments of the present application do not limit the manner or strategy for determining whether to repeatedly transmit the DCI.

S102: the base station sends the DCI repeatedly by carrying the DCI on at least two PDCCHs used for repeatedly transmitting DCI to send the DCI.

In this step, the PDCCHs used for repeatedly transmitting DCI may be pre-agreed or configured. When the base station performs the DCI repeated transmission, all PDCCHs used for repeatedly transmitting DCI may be used, or a part of the PDCCHs may be used.

The at least two PDCCHs used by the base station for repeatedly transmitting DCI may come from N (N is an integer greater than 1) PDCCH candidates in the search space of at least two CORESETs for repeatedly transmitting DCI, and each of the N PDCCH candidates corresponds to a Transmission Configuration Indicator state (TCI state). One TCI state corresponds to one TRP or one antenna panel of the TRP, and the same DCI can be repeatedly sent through at least two TRPs, or through at least two antenna panels of a same TRP, or through at least one antenna panel on at least one first TRP and at least one second TPR (where the first TRP and the second TRP are different TRPs).

Figure 2A:
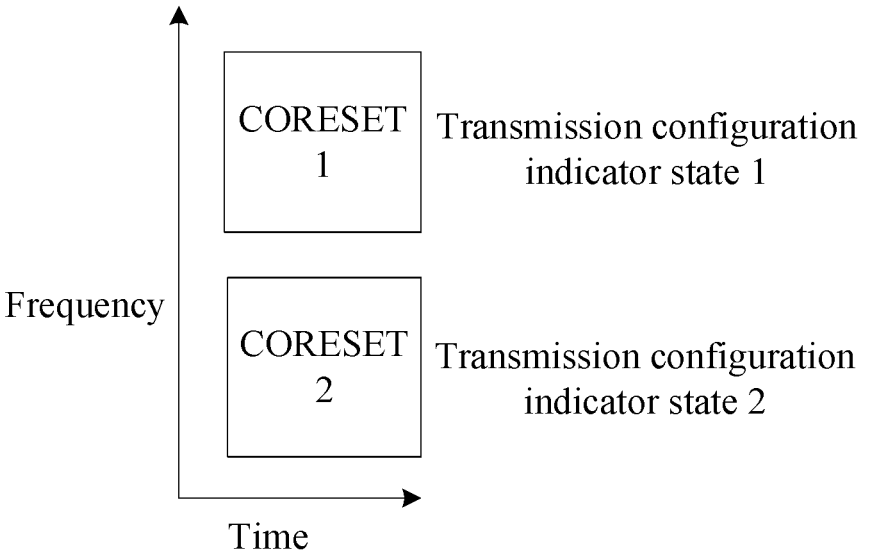
FIG. 2A exemplarily shows a schematic diagram of a CORESET configuration according to an embodiment of the present application.
Figure 2B:
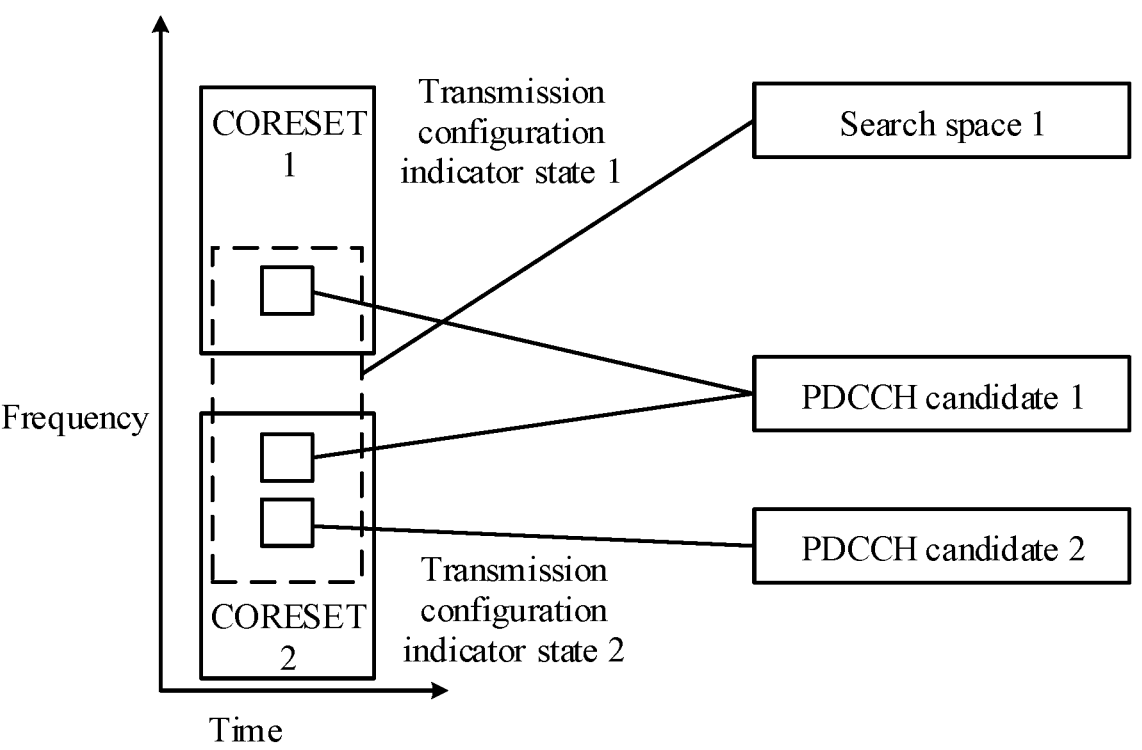
FIG. 2B exemplarily shows a schematic diagram of a configuration relationship between transmission resources for repeatedly transmitting DCI according to an embodiment of the present application.

FIG. 2A and FIG. 2B exemplarily show schematic diagrams of a configuration relationship between transmission resources according to an embodiment of the present application. The network side configures N1 (N1 is an integer greater than or equal to 1) CORESETs, each CORESET has its own TCI state, and the CORESET decides the size (such as the number of symbols occupied by PDCCH) and the frequency-domain location (such as frequency band occupied by PDCCH) of available PDCCH time-domain resources. FIG. 2A exemplarily shows a CORESET configuration, where two CORESETs 1 and 2 are configured on the network side, the CORESET 1 corresponds to the TCI state 1, and the CORESET 2 corresponds to the TCI state 2.

When allocating transmission resources for the DCI, the network side configures search spaces and PDCCH candidates, and at least one PDCCH candidate in at least one search space corresponds to one or more TCI states. In one embodiment, the base station may associate the CORESETs used for repeatedly transmitting DCI, select at least one search space from each CORESET with an association relationship, and associate these search spaces to aggregate them into a larger search space. In the above search space formed by aggregation, the PDCCH candidates from search spaces in different CORESETs are aggregated into PDCCH candidates with a higher aggregation level, and the DCI will be repeatedly sent on the PDCCHs among these PDCCH candidates. FIG. 2B exemplarily shows a configuration relationship between transmission resources for repeatedly transmitting DCI, where the PDCCH candidate 1 in the CORESET 1 and the PDCCH candidate 1 and PDCCH candidate 2 in the CORESET 2 are used for repeatedly transmitting DCI. The search space of the PDCCH candidate 1 in the CORESET 1 and the search space of the PDCCH candidate 2 in the CORESET 2 are aggregated into a larger search space 1, and the PDCCH candidates in this search space 1 are aggregated into PDCCH candidates with a higher aggregation level.

In an embodiment of the present application, the above-mentioned configuration information (association relationship information) of the transmission resources used for repeatedly transmitting DCI can be known to the terminal in various ways, and the terminal can perform the PDCCH blind detection based on the transmission resources used for DCI repeated transmission to obtain the DCI repeatedly transmitted.

In some embodiments of the present application, the base station may further perform the following operations: adding the repeated-transmission-resource indication information to the DCI sent by at least one PDCCH used for repeatedly transmitting DCI, and notifying the terminal of the transmission resources for repeatedly transmitting DCI through the repeated-transmission-resource indication information, and the terminal can perform the PDCCH blind detection on the corresponding transmission resources according to the repeated-transmission-resource indication information.

The base station may add the repeated-transmission-resource indication information to all DCIs that are repeatedly sent, or may add the repeated-transmission-resource indication information to some sent DCIs, for example, add the repeated-transmission-resource indication information to the first K (K is an integer greater than or equal to 1, and the value of K is less than the number of repeated transmissions of DCI) DCIs.

Here, the repeated-transmission-resource indication information may be used to indicate other PDCCH in the PDCCHs used for repeatedly transmitting DCI. For example, if the base station transmits the same DCI repeatedly through the PDCCH 1 and PDCCH 2, the repeated-transmission-resource indication information is added to the DCI transmitted on the PDCCH 1, to indicate other PDCCH (i.e., PDCCH 2) used for repeatedly transmitting DCI than the PDCCH (i.e., PDCCH 1) where the DCI is located.

The repeated-transmission-resource indication information may also be used to indicate the related information of other PDCCH in the PDCCHs used for repeatedly transmitting DCI. For example, if the base station transmits the same DCI repeatedly through the PDCCH 1 and PDCCH 2, the repeated-transmission-resource indication information is added to the DCI transmitted on the PDCCH 1, to indicate the related information for indicating repeated transmission resources of other PDCCH (i.e., PDCCH 2) used for repeatedly transmitting DCI than the PDCCH (i.e., PDCCH 1) where the DCI is located.

In one embodiment, the related information of other PDCCH indicated by the repeated-transmission-resource indication information may include at least one of:

(1) The TCI state of the CORESET to which other PDCCH belongs. For example, if the base station transmits the same DCI repeatedly through the PDCCH 1 and PDCCH 2, the repeated-transmission-resource indication information is added to the DCI transmitted on the PDCCH 1, to indicate the TCI state of the CORESET to which the PDCCH 2 belongs;

(2) The PDCCH candidate to which other PDCCH belongs. For example, if the base station transmits the same DCI repeatedly through the PDCCH 1 and PDCCH 2, the repeated-transmission-resource indication information is added to the DCI transmitted on the PDCCH 1, to indicate the PDCCH candidate to which the PDCCH 2 belongs, where the PDCCH candidate to which the PDCCH 2 belongs is different from the PDCCH candidate to which the PDCCH 1 belongs;

(3) The search space to which other PDCCH belongs. For example, if the base station transmits the same DCI repeatedly through the PDCCH 1 and PDCCH 2, the repeated-transmission-resource indication information is added to the DCI transmitted on the PDCCH 1, to indicate the search space to which the PDCCH 2 belongs, where the search space to which the PDCCH 2 belongs is different from the search space to which the PDCCH 1 belongs;

(4) The CORESET to which other PDCCH belongs. For example, if the base station transmits the same DCI repeatedly through the PDCCH 1 and PDCCH 2, the repeated-transmission-resource indication information is added to the DCI transmitted on the PDCCH 1, to indicate the CORESET to which the PDCCH 2 belongs, where the CORESET to which the PDCCH 2 belongs is different from the CORESET to which the PDCCH 1 belongs;

(5) The aggregation level of other PDCCH. For example, if the base station transmits the same DCI repeatedly through the PDCCH 1 and PDCCH 2, the repeated-transmission-resource indication information is added to the DCI transmitted on the PDCCH 1, to indicate the aggregation level of the PDCCH candidate to which the PDCCH 2 belongs, where the aggregation level of the PDCCH candidate to which the PDCCH 2 belongs may be the same as or different from the aggregation level of the PDCCH candidate to which the PDCCH 1 belongs.

In some embodiments of the present application, the base station may further perform the following operation: sending an association relationship between transmission resources or a rule for determining the association relationship between transmission resources to a terminal through high-layer signaling, and the terminal can perform the PDCCH blind detection on the corresponding transmission resources according to the repeated-transmission-resource indication information.

In one embodiment, the above-mentioned association relationship between transmission resources for repeatedly transmitting DCI includes at least one of followings.

(1) An association relationship between TCI states of CORESETs to which the PDCCHs used for repeatedly transmitting DCI belong. For example, there is an association relationship of TCI states of CORESETs with odd CORESET numbers, or there is an association relationship of TCI states of CORESETs with even CORESET numbers.

For example, the TCI state 1 is associated with the CORESET 1, and the TCI state 2 is associated with the CORESET 2, and then the TCI state 1 is associated with the TCI state 2 (that is, there is an association relationship between TCI state 1 and TCI state 2), indicating that the CORESET 1 associated with the TCI state 1 and the CORESET 2 associated with the TCI state 2 are transmission resources used for repeatedly transmitting DCI. When performing the PDCCH blind detection, the terminal can perform the PDCCH blind detection based on the TCI state 1 and the CORESET 2 associated with the TCI state 2.

(2) An association relationship between PDCCH candidates to which the PDCCHs used for repeatedly transmitting DCI belong. For example, Z PDCCH candidates with the smallest or largest number in the search space have an association relationship, where Z is an agreed value or a configuration value.

For example, the PDCCH candidate 1 and PDCCH candidate 2 are two PDCCH candidates with the largest number in the search space, and the PDCCH candidate 1 is associated with the PDCCH candidate 2 (that is, there is an association relationship between PDCCH candidate 1 and PDCCH candidate 2), indicating that the PDCCH candidate 1 and PDCCH candidate 2 are transmission resources for repeatedly transmitting DCI. When performing the PDCCH blind detection, the terminal can perform the PDCCH blind detection based on the PDCCH candidate 1 and PDCCH candidate 2.

(3) An association relationship between search spaces to which the PDCCHs used for repeatedly transmitting DCI belong. For example, Y search spaces with the smallest or largest CORESET number have an association relationship, where Y is an agreed value or a configuration value.

For example, the search space 1 and search space 2 are two search spaces containing the largest CORESET number, and the search space 1 is associated with the search space 2 (that is, there is an association relationship between search space 1 and search space 2), indicating that the search space 1 and search space 2 are transmission resources for repeatedly transmitting DCI. When performing the PDCCH blind detection, the terminal can perform the PDCCH blind detection based on the search space 1 and search space 2.

(4) An association relationship between CORESETs to which the PDCCHs used for repeatedly transmitting DCI belong. For example, the CORESETs with a remainder of 0 after the CORESET number modulo x have an association relationship, where x is an integer greater than 1.

(5) An association relationship between aggregation levels of PDCCHs used for repeatedly transmitting DCI. For example, the PDCCHs with a same aggregation level are associated, indicating that the PDCCHs with this aggregation level are PDCCHs used for repeatedly transmitting DCI. For another example, the PDCCHs with aggregation levels having an appointed multiple relation are associated, indicating that the PDCCHs with aggregation levels having the appointed multiple relation are PDCCHs used for repeatedly transmitting DCI.

The association relationships listed above may also be used in combination, that is, the association relationship between transmission resources used for repeatedly transmitting DCI may include a combination of the foregoing several association relationships.

The above-mentioned rule for determining the association relationship between transmission resources may be defined according to the resource deployment and resource usage. For example, the following rule may be defined: there is an association relationship between the CORESET number to which the PDCCH belongs and the CORESET with a remainder of 0 after the modulo operation of the parameter x, where x is an integer greater than 1, and the parameter x may be pre-agreed or configured by the network side. For another example, the PDCCHs with a same aggregation level have an association relationship, or the PDCCHs with an appointed multiple relation have an association relationship.

In some embodiments of the present application, the base station may further perform the following operation: sending a configuration parameter used by a rule for determining an association relationship between transmission resources to a terminal through high-layer signaling, and the terminal can perform the PDCCH blind detection on the corresponding transmission resources according to the repeated-transmission-resource indication information.

Here, the explanation of the association relationship between transmission resources used for repeatedly transmitting DCI is the same as that in the foregoing embodiment, and will not be repeated here.

Here, for the explanation of the above rule for determining the association relationship between transmission resources, reference may be made to the foregoing embodiment. The rule may be pre-agreed or may be configured by the base station (for example, sent by the base station to the terminal through high layer signaling). For example, the base station and the terminal pre-agrees a CORESET number with the result of the modulo operation of the parameter x being zero, and the corresponding CORESETs have an associated relationship, that is, these CORESETs are CORESETs used for repeatedly transmitting DCI, and then the base station sends the value of the parameter x to the terminal through high-layer signaling. For another example, the base station and the terminal pre-agree that the PDCCHs with the same aggregation level are PDCCHs used for repeatedly transmitting DCI, and then the base station sends the value of the aggregation level to the terminal through high-layer signaling; or the base station and the terminal agree that the PDCCHs with a certain multiple relation have an association relationship, and then the base station sends the value of the multiple to the terminal.

In some embodiments of the present application, two or more of the above-listed manners may also be used in combination to indicate the transmission resources used for repeatedly transmitting DCI to the terminal.

For example, in an example of using the pre-agreed manner in combination with the DCI for indication, the base station and the terminal pre-agree that the PDCCHs with an aggregation level of 2 have an association relationship (that is, the PDCCHs with the aggregation level of 2 are PDCCHs used for repeatedly transmitting DCI), and the base station adds the repeated-transmission-resource indication information to the repeatedly sent DCI, where the indication information indicates the TCI state of the CORESET to which other PDCCH belongs. In the case where the above-mentioned combination method is used to indicate the transmission resources for repeatedly transmitting DCI to the terminal, after the terminal receives the DCI containing the above-mentioned repeated-transmission-resource indication information, the terminal can determine the TCI state of the CORESET to which other PDCCH belongs according to the repeated-transmission-resource indication information contained in the DCI, and further determine that the same DCI is transmitted on the PDCCHs with the aggregation level of 2 in the CORESET associated with the TCI state according to the pre-agreed aggregation level.

For another example, in an example of using the high-layer signaling configuration manner in combination with the DCI for the indication, the base station indicates through the high-layer signaling that the PDCCHs with the aggregation level of 2 have an association relationship (that is, the PDCCHs with the aggregation level of 2 are PDCCHs used for repeatedly transmitting DCI), and the base station adds the repeated-transmission-resource indication information to the repeatedly sent DCI, where the indication information indicates the CORESET to which other PDCCH belongs. In the case where the above-mentioned combination method is used to indicate the transmission resources for repeatedly transmitting DCI to the terminal, after the terminal receives the DCI containing the above-mentioned repeated-transmission-resource indication information, the terminal can determine the CORESET to which other PDCCH belongs according to the repeated-transmission-resource indication information contained in the DCI, and further determine that the same DCI is transmitted on the PDCCHs with the aggregation level of 2 in the CORESET associated with the TCI state according to the aggregation level configured by the high-layer signaling.

It should be noted that the above only exemplarily enumerates several examples in which the transmission resources used for repeatedly transmitting DCI are indicated to the terminal in a combined manner, which is not limited in the embodiments of the present application.

In the above-mentioned embodiments of the present application, the same DCI is repeatedly carried on at least two PDCCHs for repeated transmission. When some PDCCHs cannot be successfully detected by the terminal in the PDCCHs used for repeatedly transmitting DCI due to blocking or interference, the terminal can also detect the remaining PDCCHs to obtain the DCI, to improve the reliability of the DCI transmission.

In an embodiment of the present application, on the terminal side, the terminal receives the DCI sent by the base station, where the DCI is repeatedly carried on at least two PDCCHs used for repeatedly transmitting DCI. The method for repeatedly transmitting DCI is the same as that in the foregoing embodiment, and will not be repeated here.

In an embodiment of the present application, whether to repeatedly transmit the DCI may be pre-agreed or configured through high layer signaling. For example, if the repeated transmission of the DCI is configured through the high layer signaling, the terminal performs the PDCCH detection to obtain the DCI according to the method provided in the embodiments of the present application; otherwise, the PDCCH detection is performed according to a conventional method.

The terminal may detect all PDCCHs used for repeatedly transmitting DCI, or may detect other PDCCHs used for repeatedly transmitting DCI only when failing to detect the current PDCCH.

Figure 3:
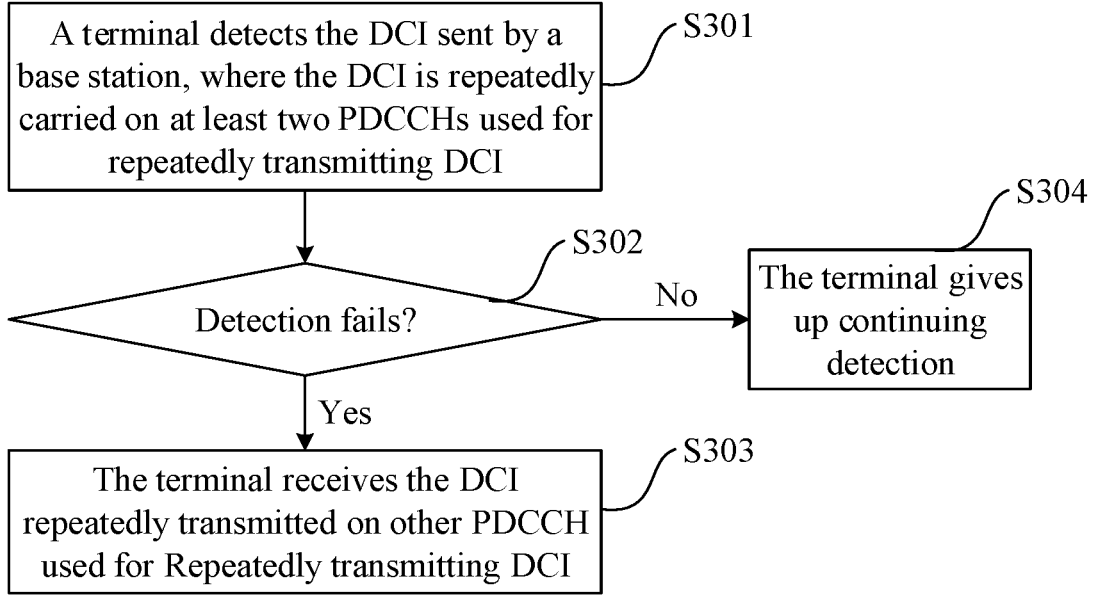
FIG. 3 exemplarily shows a flowchart of a control information transmission method implemented on a terminal side according to an embodiment of the present application.

FIG. 3 exemplarily shows a flowchart of a control information transmission method implemented on a terminal side according to an embodiment of the present application. The process includes the following steps:

S301: a terminal receives the DCI sent by a base station by detecting a PDCCH used for repeatedly transmitting DCI, where the DCI is repeatedly carried on at least two PDCCHs used for repeatedly transmitting DCI.

S302: if the terminal fails to detect the DCI, go to S303; otherwise, go to S304.

S303: the terminal receives the DCI repeatedly transmitted on other PDCCH used for repeatedly transmitting DCI.

S304: the terminal gives up continuing detection.

In one embodiment, in S304, when the terminal fails to detect the DCI, this step may include at least one of:

giving up detecting the DCI repeatedly transmitted on other PDCCHs;

giving up detecting a CORESET for repeatedly transmitting DCI;

giving up detecting a search space for repeatedly transmitting DCI;

giving up detecting PDCCH candidates with a same and/or agreed relationship and/or a specified aggregation level for repeatedly transmitting DCI.

In some embodiments of the present application, the terminal may know the transmission resources used for repeated transmission of the DCI. Thus, when the terminal fails to detect the DCI transmitted by the current PDCCH, the terminal may continue to detect the transmission resources (for example, at least one of other PDCCHs, other PDCCH candidates, other CORESETs, TCI states of other CORESETs, other search spaces, and other aggregation levels) for repeated transmission of the DCI; and when the terminal successfully detects the DCI transmitted by the current PDCCH, the terminal may give up continuing to detect the transmission resources for repeated transmission of the DCI, to save the overhead of the terminal.

For example, when the terminal successfully detects the DCI, the obtained aggregation level of the PDCCH candidate that transmits the DCI is 2, and then the terminal gives up detecting the CORESETs or search spaces corresponding to PDCCH candidates with the aggregation level of 2 or these PDCCH candidates.

In an embodiment of the present application, according to the configuration manner of the transmission resources used for repeatedly transmitting DCI, the terminal may know the transmission resources used for repeatedly transmitting DCI in a corresponding manner. Here, for the configuration manner of the transmission resources used for repeatedly transmitting DCI, reference may be made to the foregoing embodiments. The cases where the terminal determines the transmission resources used for repeatedly transmitting DCI in different ways will be briefly illustrated below.

In some embodiments of the present application, if the DCI currently successfully detected by the terminal includes the repeated-transmission-resource indication information, the terminal may determine other PDCCHs for repeatedly transmitting DCI or the related information of other PDCCHs according to the repeated-transmission-resource indication information, to determine other transmission resources for repeatedly transmitting DCI, and perform the PDCCH blind detection according to the other transmission resources to obtain the DCI repeatedly transmitted. Here, for the relevant description of the repeated-transmission-resource indication information, reference may be made to the foregoing embodiments, which will not be repeated here.

In some embodiments of the present application, the terminal may further perform the following operation: receiving an association relationship between transmission resources or a rule for determining the association relationship between transmission resources sent by the base station through high layer signaling. The terminal may determine the transmission resource for repeatedly transmitting DCI according to the association relationship between transmission resources or the rule for determining the association relationship between transmission resources sent through the high layer signaling, and then perform the PDCCH blind detection according to the transmission resource to obtain the DCI repeatedly transmitted.

Here, for the related description of the association relationship between transmission resources used for repeatedly transmitting DCI and the rule for determining the association relationship between transmission resources, reference may be made to the foregoing embodiments, which will not be repeated here.

In above-mentioned embodiments, the terminal determines the transmission resource for repeatedly transmitting DCI according to the association relationship between transmission resources sent through the high layer signaling, including at least one of:

(1) The terminal determines the TCI state of the CORESET to which other PDCCH carrying the DCI repeatedly belongs according to the association relationship between TCI states of CORESETs;

(2) The terminal determines the PDCCH candidate to which other PDCCH carrying the DCI repeatedly belongs according to the association relationship between PDCCH candidates;

(3) The terminal determines the search space to which other PDCCH carrying the DCI repeatedly belongs according to the association relationship between search spaces;

(4) The terminal determines the CORESET to which other PDCCH carrying the DCI repeatedly belongs according to the association relationship between CORESETs;

(5) The terminal determines the aggregation level of other PDCCH carrying the DCI repeatedly belongs according to the association relationship between aggregation levels of PDCCHs.

If the base station sends a rule for determining the association relationship between transmission resources through high layer signaling, the terminal can determine the related information of other PDCCH according to the association relationship between repeated transmission resources indicated by the rule. The specific method is the same as the above method, and will not be repeated here.

In some embodiments of the present application, the terminal may further perform the following operation: receiving a configuration parameter used by a rule for determining an association relationship between transmission resources sent by the base station through high layer signaling. The terminal may determine the transmission resource for repeatedly transmitting DCI according to the configuration parameter used by the rule for determining the association relationship between transmission resources sent through the high layer signaling, and then perform the PDCCH blind detection according to the transmission resource to obtain the DCI repeatedly transmitted.

Here, for the related description of the association relationship between transmission resources used for repeatedly transmitting DCI and the rule for determining the association relationship between transmission resources, reference may be made to the foregoing embodiments, which will not be repeated here.

In some embodiments of the present application, the terminal may also use two or more of the above-listed manners in combination to determine the transmission resources used for repeatedly transmitting DCI.

For example, in an example of using the pre-agreed manner in combination with the DCI to determine the transmission resources used for repeatedly transmitting DCI, the terminal and the base station pre-agree that the PDCCHs with an aggregation level of 2 have an association relationship (that is, the PDCCHs with the aggregation level of 2 are PDCCHs used for repeatedly transmitting DCI), and the terminal determines the aggregation level of other PDCCH according to the repeated-transmission-resource indication information included in the received DCI, where the indication information indicates the TCI state of the CORESET to which other PDCCH belongs.

For another example, in an example of using the high-layer signaling configuration manner in combination with the DCI to determine the transmission resources for repeatedly transmitting DCI, the terminal receives PDCCHs having an association relationship (for example, the rule for determining the association relationship between transmission resources is: aggregation levels of PDCCHs are the same) and the DCI that includes the repeated-transmission-resource indication information indicating the CORESET to which other PDCCH belongs, and the terminal determines the aggregation level of other PDCCH according to the CORESET to which other PDCCH belongs.

In the above process, the terminal receives the DCI sent by the base station, where the DCI is repeatedly carried on at least two PDCCHs for repeated transmission. When some PDCCHs cannot be successfully detected by the terminal in the PDCCHs used for repeatedly transmitting DCI due to blocking or interference, the terminal can also detect the remaining PDCCHs to obtain the DCI, to improve the reliability of the DCI transmission. Further, when the terminal successfully detects the received DCI, the terminal can give up the blind detection of other PDCCHs that repeatedly transmit the DCI, to reduce the overhead occupied by detection.

For example, if the terminal successfully detects the currently received DCI and determines the TCI state of the CORESET to which other PDCCHs belong according to the repeated-transmission-resource indication information in the DCI, the terminal will no longer perform the PDCCH blind detection according to the CORESET associated with the TCI state; for another example, if the terminal successfully detects the currently received DCI and determines the PDCCH candidates to which other PDCCHs belong according to the repeated-transmission-resource indication information in the DCI, the terminal will no longer perform the PDCCH blind detection according to the PDCCH candidates; for another example, if the terminal successfully detects the currently received DCI and determines the search space to which other PDCCHs belong according to the repeated-transmission-resource indication information in the DCI, the terminal will no longer perform the PDCCH blind detection according to the search space; for another example, if the terminal successfully detects the currently received DCI and determines the CORESET to which other PDCCHs belong according to the repeated-transmission-resource indication information in the DCI, the terminal will no longer perform the PDCCH blind detection according to the CORESET; for another example, if the terminal successfully detects the currently received DCI and determines the search space to which other PDCCHs belong and the aggregation level of other PDCCHs according to the DCI, the terminal will no longer perform the PDCCH blind detection on the PDCCH candidates with this aggregation level in the search space.

Based on the embodiment of the present application provides a base station, which can implement the method on the base station side in the foregoing embodiments.

Figure 4:
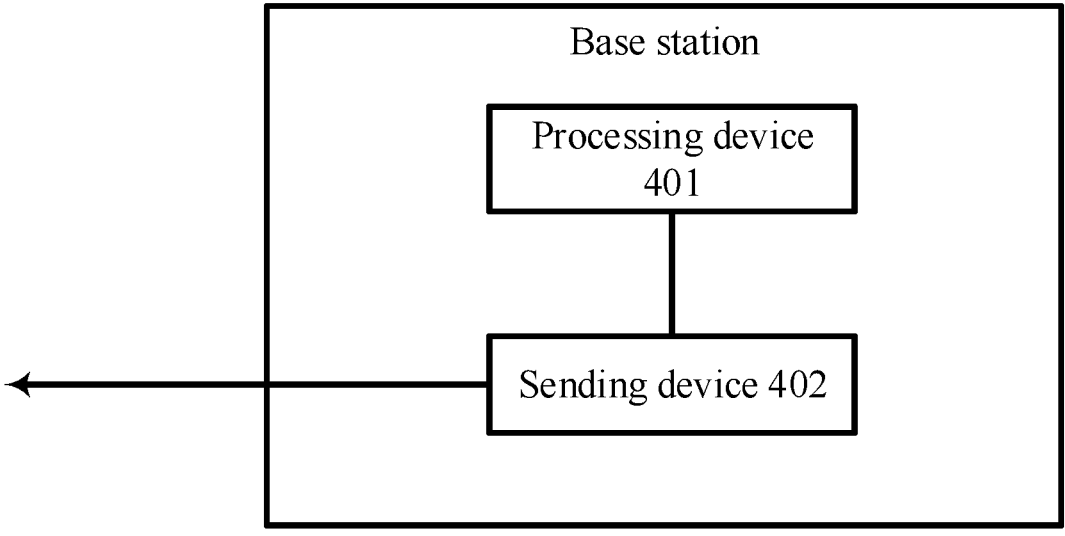
FIG. 4 exemplarily shows a structural schematic diagram of a base station according to an embodiment of the present application.

Referring to FIG. 4, the base station includes: a processing device 401 and a sending device 402.

The processing device 401 is configured to determine to perform repeated transmission of DCI.

The sending device 402 is configured to carry the DCI repeatedly on at least two PDCCHs used for repeatedly transmitting DCI to send the DCI.

In one embodiment, the at least two PDCCHs used for repeatedly transmitting DCI are from N PDCCH candidates of at least two CORESETs; where each of the N PDCCH candidates corresponds to a TCI state, and N is an integer greater than 1.

In one embodiment, the DCI sent by at least one of the at least two PDCCHs includes repeated-transmission-resource indication information used to indicate other PDCCH that repeatedly transmits the DCI in at least two PDCCHs or related information of the other PDCCH.

In one embodiment, the related information of the other PDCCH indicated by the repeated-transmission-resource indication information includes at least one of:

a TCI state of a CORESET to which the other PDCCH belongs;

a PDCCH candidate to which the other PDCCH belongs;

a search space to which the other PDCCH belongs;

a CORESET to which the other PDCCH belongs;

an aggregation level of the other PDCCH.

In one embodiment, the operations performed by the base station further include: sending an association relationship between transmission resources or a rule for determining the association relationship between transmission resources to a terminal through high-layer signaling; where the association relationship is an association relationship between transmission resources used for repeatedly transmitting DCI, and the association relationship between transmission resources includes an association relationship between PDCCHs used for repeatedly transmitting DCI or an association relationship between at least one kind of related information of PDCCHs used for repeatedly transmitting DCI.

In one embodiment, the operations performed by the base station further include: sending a configuration parameter used by a rule for determining an association relationship between transmission resources to a terminal through high-layer signaling; where the association relationship is an association relationship between transmission resources used for repeatedly transmitting DCI, and the association relationship between transmission resources includes an association relationship between PDCCHs used for repeatedly transmitting DCI or an association relationship between at least one kind of related information of PDCCHs used for repeatedly transmitting DCI.

In one embodiment, the base station pre-agrees with a terminal on at least one of:

an association relationship between transmission resources;

a rule for determining the association relationship between transmission resources;

a configuration parameter used by the rule for determining the association relationship between transmission resources;

where the association relationship is an association relationship between transmission resources used for repeatedly transmitting DCI, and the association relationship between transmission resources includes an association relationship between PDCCHs used for repeatedly transmitting DCI or an association relationship between related information of PDCCHs used for repeatedly transmitting DCI.

In one embodiment, the association relationship includes at least one of:

an association relationship between TCI states of CORE-SETs to which the PDCCHs used for repeatedly transmitting DCI belong;

an association relationship between PDCCH candidates to which the PDCCHs used for repeatedly transmitting DCI belong;

an association relationship between search spaces to which the PDCCHs used for repeatedly transmitting DCI belong;

an association relationship between CORESETs to which the PDCCHs used for repeatedly transmitting DCI belong;

an association relationship between aggregation levels of the PDCCHs used for repeatedly transmitting DCI.

It should be noted here that the above-mentioned base station provided in this embodiment of the disclosure can implement all the method steps implemented in the above-mentioned method embodiment. The parts and beneficial effects in this embodiment same as those in the method embodiment will not be described here in detail.

An embodiment of the present application provides a terminal, which can implement the method on the terminal side in the foregoing embodiments.

Figure 5:
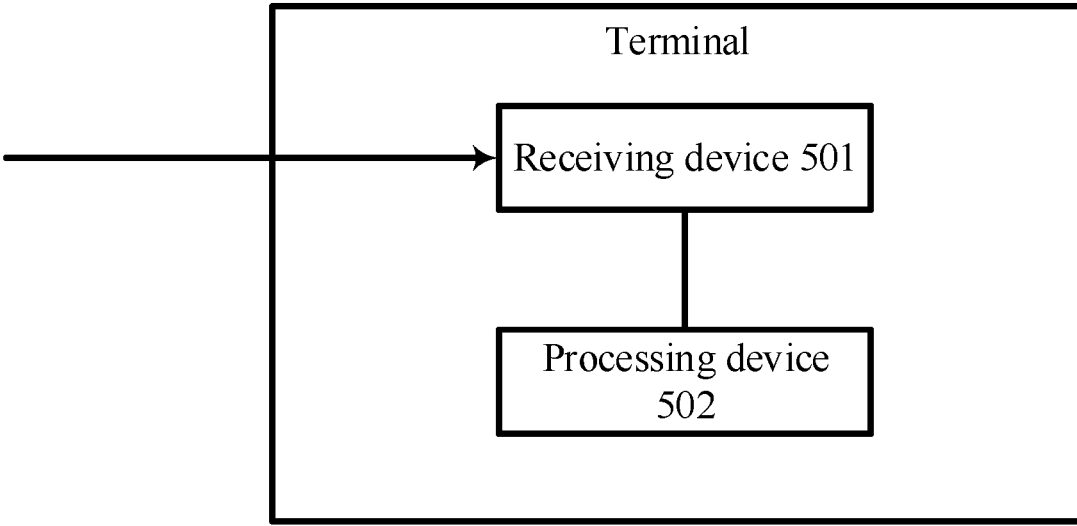
FIG. 5 exemplarily shows a structural schematic diagram of a terminal according to an embodiment of the present application.

Referring to FIG. 5, the terminal includes: a receiving device 501 and a processing device 502.

The receiving device 501 is configured to receive DCI sent by a base station, where the DCI is repeatedly carried on at least two PDCCHs used for repeatedly transmitting DCI.

The processing device 502 is configured to: receive the DCI repeatedly transmitted on other PDCCH used for repeated transmission of the DCI if the terminal fails to detect the DCI; otherwise, perform at least one of:

giving up receiving the DCI repeatedly transmitted on the other PDCCH;

giving up detecting a CORESET for repeatedly transmitting DCI;

giving up detecting a search space for repeatedly transmitting DCI;

giving up detecting other aggregation level for repeatedly transmitting DCI.

In one embodiment, the at least two PDCCHs used for repeatedly transmitting DCI are from N PDCCH candidates of at least two CORESETs; where each of the N PDCCH candidates corresponds to a TCI state, and N is an integer greater than 1.

In one embodiment, the DCI sent by at least one of the at least two PDCCHs includes repeated-transmission-resource indication information used to indicate other PDCCH that repeatedly transmits the DCI in at least two PDCCHs or related information of the other PDCCH.

In one embodiment, receiving the DCI repeatedly transmitted on other PDCCH used for repeatedly carrying the DCI, includes detecting the other PDCCH according to the repeated-transmission-resource indication information included in the received DCI, to receive the DCI carried by the other PDCCH.

In one embodiment, the related information of the other PDCCH indicated by the repeated-transmission-resource indication information includes at least one of:

a TCI state of a CORESET to which the other PDCCH belongs;

a PDCCH candidate to which the other PDCCH belongs;

a search space to which the other PDCCH belongs;

a CORESET to which the other PDCCH belongs;

an aggregation level of the other PDCCH.

In one embodiment, the operations performed by the terminal further include: receiving an association relationship between transmission resources or a rule for determining the association relationship between transmission resources sent by the base station through high-layer signaling; where the association relationship is an association relationship between transmission resources used for repeatedly transmitting DCI, and the association relationship between transmission resources includes an association relationship between PDCCHs used for repeatedly transmitting DCI or an association relationship between at least one kind of related information of PDCCHs used for repeatedly transmitting DCI.

The operation of receiving the DCI repeatedly transmitted on other PDCCH used for repeatedly carrying the DCI, includes detecting the other PDCCH at least according to the association relationship between transmission resources or the rule for determining the association relationship between transmission resources, to receive the DCI carried by the other PDCCH.

In one embodiment, the operations performed by the terminal further include: receiving a configuration parameter used by a rule for determining an association relationship between transmission resources sent by the base station through high-layer signaling; where the association relationship is an association relationship between transmission resources used for repeatedly transmitting DCI, and the association relationship between transmission resources includes an association relationship between PDCCHs used for repeatedly transmitting DCI or an association relationship between at least one kind of related information of PDCCHs used for repeatedly transmitting DCI.

The operation of receiving the DCI repeatedly transmitted on other PDCCH used for repeatedly carrying the DCI, includes:

determining the association relationship between transmission resources at least according to the rule for determining the association relationship between transmission resources and the configuration parameter;

detecting the other PDCCH according to the association relationship, to receive the DCI carried by the other PDCCH.

In one embodiment, the terminal pre-agrees with the base station on at least one of:

an association relationship between transmission resources;

a rule for determining the association relationship between transmission resources;

a configuration parameter used by the rule for determining the association relationship between transmission resources;

where the association relationship is an association relationship between transmission resources used for repeatedly transmitting DCI, and the association relationship between transmission resources includes an association relationship between PDCCHs used for repeatedly transmitting DCI or an association relationship between related information of PDCCHs used for repeatedly transmitting DCI.

In one embodiment, the at least one association relationship includes at least one of:

an association relationship between TCI states of CORE-SETs to which the PDCCHs used for repeatedly transmitting DCI belong;

an association relationship between PDCCH candidates to which the PDCCHs used for repeatedly transmitting DCI belong;

an association relationship between search spaces to which the PDCCHs used for repeatedly transmitting DCI belong;

an association relationship between CORESETs to which the PDCCHs used for repeatedly transmitting DCI belong;

an association relationship between aggregation levels of the PDCCHs used for repeatedly transmitting DCI.

It should be noted here that the above-mentioned terminal provided in this embodiment of the disclosure can implement all the method steps implemented in the above-mentioned method embodiment. The parts and beneficial effects in this embodiment same as those in the method embodiment will not be described here in detail.

An embodiment of the present application further provides a base station, which can implement the functions of the base station side in the foregoing embodiments.

Figure 6:
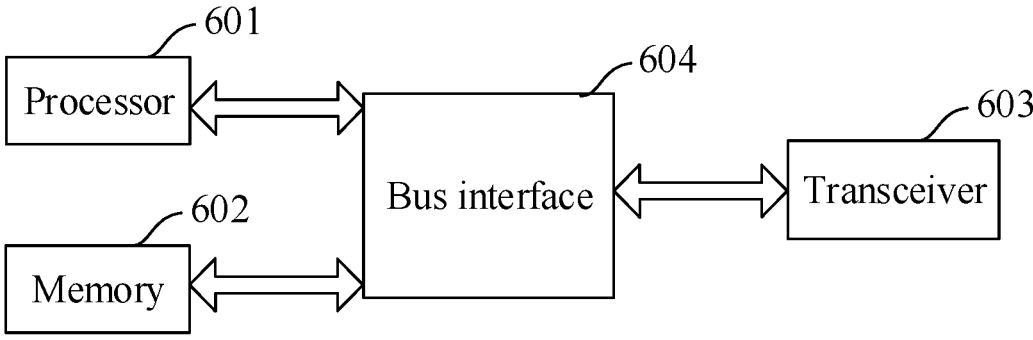
FIG. 6 exemplarily shows a structural schematic diagram of a base station according to an embodiment of the present application.

FIG. 6 exemplarily shows a structural schematic diagram of the base station in the embodiment of the present application. As shown, the base station may include: a processor 601, a memory 602, a transceiver 603 and a bus interface 604.

The memory 602 may store computer instructions used by the processor 601 in performing operations. The transceiver 603 is configured to receive and send the data under the control of the processor 601. The processor 601 is configured to read the computer instructions stored in the memory 602, is responsible for managing the bus architecture and general processing, and performs the following operations:

determining to perform repeated transmission of DCI;

carrying the DCI repeatedly on at least two PDCCHs used for repeatedly transmitting DCI to send the DCI.

In one embodiment, the at least two PDCCHs used for repeatedly transmitting DCI are from N PDCCH candidates of at least two CORESETs; where each of the N PDCCH candidates corresponds to a TCI state, and N is an integer greater than 1.

In one embodiment, the DCI sent by at least one of the at least two PDCCHs includes repeated-transmission-resource indication information used to indicate other PDCCH that repeatedly transmits the DCI in at least two PDCCHs or related information of the other PDCCH.

In one embodiment, the related information of the other PDCCH indicated by the repeated-transmission-resource indication information includes at least one of:

a TCI state of a CORESET to which the other PDCCH belongs;

a PDCCH candidate to which the other PDCCH belongs;

a search space to which the other PDCCH belongs;

a CORESET to which the other PDCCH belongs;

an aggregation level of the other PDCCH.

In one embodiment, the operations performed by the base station further include: sending an association relationship between transmission resources or a rule for determining the association relationship between transmission resources to a terminal through high-layer signaling; where the association relationship is an association relationship between transmission resources used for repeatedly transmitting DCI, and the association relationship between transmission resources includes an association relationship between PDCCHs used for repeatedly transmitting DCI or an association relationship between at least one kind of related information of PDCCHs used for repeatedly transmitting DCI.

In one embodiment, the operations performed by the base station further include: sending a configuration parameter used by a rule for determining an association relationship between transmission resources to a terminal through high-layer signaling; where the association relationship is an association relationship between transmission resources used for repeatedly transmitting DCI, and the association relationship between transmission resources includes an association relationship between PDCCHs used for repeatedly transmitting DCI or an association relationship between at least one kind of related information of PDCCHs used for repeatedly transmitting DCI.

In one embodiment, the base station pre-agrees with a terminal on at least one of:

an association relationship between transmission resources;

a rule for determining the association relationship between transmission resources;

a configuration parameter used by the rule for determining the association relationship between transmission resources;

where the association relationship is an association relationship between transmission resources used for repeatedly transmitting DCI, and the association relationship between transmission resources includes an association relationship between PDCCHs used for repeatedly transmitting DCI or an association relationship between related information of PDCCHs used for repeatedly transmitting DCI.

In one embodiment, the association relationship includes at least one of:

an association relationship between TCI states of CORESETs to which the PDCCHs used for repeatedly transmitting DCI belong;

an association relationship between PDCCH candidates to which the PDCCHs used for repeatedly transmitting DCI belong;

an association relationship between search spaces to which the PDCCHs used for repeatedly transmitting DCI belong;

an association relationship between CORESETs to which the PDCCHs used for repeatedly transmitting DCI belong;

an association relationship between aggregation levels of the PDCCHs used for repeatedly transmitting DCI.

The bus architecture may include any numbers of interconnected buses and bridges, and specifically link various circuits of one or more processors represented by the processor 601 and the memory represented by the memory 602. The bus architecture may further link various other circuits such as peripheral device, voltage regulator and power management circuit, which are all well known in the art and thus will not be further described again herein. The bus interface provides an interface. The processor 601 is responsible for managing the bus architecture and general processing, and the memory 602 may store the data used by the processor 601 when performing the operations.

The procedure disclosed by embodiments of the present application may be applied in the processor 601 or implemented by the processor 601. In the implementation process, each step of the signal processing flow may be completed by the integrated logic circuit of hardware in the processor 601 or the instruction in the form of software. The processor 601 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random-access memory, flash memory, read only memory, programmable read only memory or electrically erasable programmable read only memory, register and other mature storage medium in the art. The storage medium is located in the memory 602, and the processor 601 reads the information in the memory 602 and completes the steps of the signal processing flow in combination with its hardware.

In one embodiment, the processor 601 is configured to read the computer instructions in the memory 602 and execute the functions implemented by the base station side in the foregoing embodiments.

It should be noted here that the above-mentioned base station provided in this embodiment of the disclosure can implement all the method steps implemented in the above-mentioned method embodiment. The parts and beneficial effects in this embodiment same as those in the method embodiment will not be described here in detail.

An embodiment of the present application provides a terminal, which can implement the functions of the terminal side in the foregoing embodiments.

Figure 7:
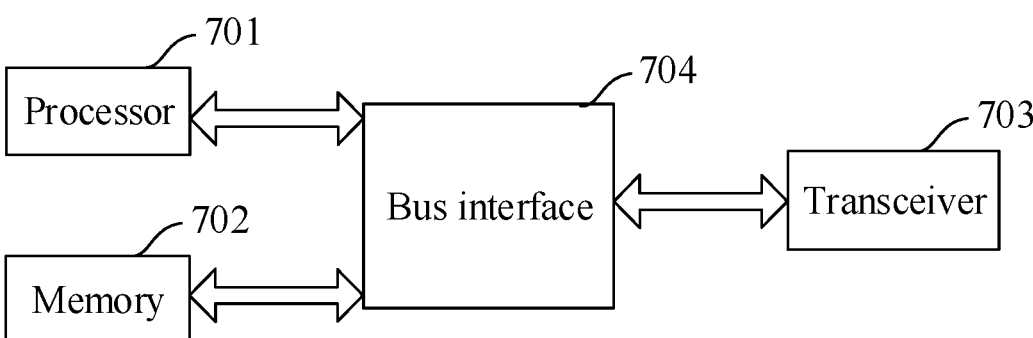
FIG. 7 exemplarily shows a structural schematic diagram of a terminal according to an embodiment of the present application.

FIG. 7 exemplarily shows a structural schematic diagram of the terminal in the embodiment of the present application. As shown, the terminal may include: a processor 701, a memory 702, a transceiver 703 and a bus interface 704.

The memory 702 may store computer instructions used by the processor 701 in performing operations. The transceiver 703 is configured to receive and send the data under the control of the processor 701. The processor 701 is configured to read the computer instructions stored in the memory 702, is responsible for managing the bus architecture and general processing, and performs the following operations:

receiving DCI sent by a base station, where the DCI is repeatedly carried on at least two PDCCHs used for repeatedly transmitting DCI.

In one embodiment, if the terminal fails to detect the DCI, the DCI repeatedly transmitted on other PDCCH used for repeatedly transmitting DCI is received; otherwise, at least one of the following operations is performed:

giving up receiving the DCI repeatedly transmitted on the other PDCCH;

giving up detecting a CORESET for repeatedly transmitting DCI;

giving up detecting a search space for repeatedly transmitting DCI;

giving up detecting PDCCH candidates with a same or specified aggregation level for repeatedly transmitting DCI.

In one embodiment, the at least two PDCCHs used for repeatedly transmitting DCI are from N PDCCH candidates of at least two CORESETs; where each of the N PDCCH candidates corresponds to a TCI state, and N is an integer greater than 1.

In one embodiment, the DCI sent by at least one of the at least two PDCCHs includes repeated-transmission-resource indication information used to indicate other PDCCH that repeatedly transmits the DCI in at least two PDCCHs or related information of the other PDCCH.

In one embodiment, receiving the DCI repeatedly transmitted on other PDCCH used for repeatedly carrying the DCI, includes detecting the other PDCCH according to the repeated-transmission-resource indication information included in the received DCI, to receive the DCI carried by the other PDCCH.

In one embodiment, the related information of the other PDCCH indicated by the repeated-transmission-resource indication information includes at least one of:

a TCI state of a CORESET to which the other PDCCH belongs;

a PDCCH candidate to which the other PDCCH belongs;

a search space to which the other PDCCH belongs;

a CORESET to which the other PDCCH belongs;

an aggregation level of the other PDCCH.

In one embodiment, the operations performed by the terminal further include: receiving an association relationship between transmission resources or a rule for determining the association relationship between transmission resources sent by the base station through high-layer signaling; where the association relationship is an association relationship between transmission resources used for repeatedly transmitting DCI, and the association relationship between transmission resources includes an association relationship between PDCCHs used for repeatedly transmitting DCI or an association relationship between at least one kind of related information of PDCCHs used for repeatedly transmitting DCI.

The operation of receiving the DCI repeatedly transmitted on other PDCCH used for repeatedly carrying the DCI, includes detecting the other PDCCH at least according to the association relationship between transmission resources or the rule for determining the association relationship between transmission resources, to receive the DCI carried by the other PDCCH.

In one embodiment, the operations performed by the terminal further include: receiving a configuration parameter used by a rule for determining an association relationship between transmission resources sent by the base station through high-layer signaling; where the association relationship is an association relationship between transmission resources used for repeatedly transmitting DCI, and the association relationship between transmission resources includes an association relationship between PDCCHs used for repeatedly transmitting DCI or an association relationship between at least one kind of related information of PDCCHs used for repeatedly transmitting DCI.

The operation of receiving the DCI repeatedly transmitted on other PDCCH used for repeatedly carrying the DCI, includes:

determining the association relationship between transmission resources at least according to the rule for determining the association relationship between transmission resources and the configuration parameter;

detecting the other PDCCH according to the association relationship, to receive the DCI carried by the other PDCCH.

In one embodiment, the terminal pre-agrees with the base station on at least one of:

an association relationship between transmission resources;

a rule for determining the association relationship between transmission resources;

a configuration parameter used by the rule for determining the association relationship between transmission resources;

where the association relationship is an association relationship between transmission resources used for repeatedly transmitting DCI, and the association relationship between transmission resources includes an association relationship between PDCCHs used for repeatedly transmitting DCI or an association relationship between related information of PDCCHs used for repeatedly transmitting DCI.

In one embodiment, the at least one association relationship includes at least one of:

an association relationship between TCI states of CORESETs to which the PDCCHs used for repeatedly transmitting DCI belong;

an association relationship between PDCCH candidates to which the PDCCHs used for repeatedly transmitting DCI belong;

an association relationship between search spaces to which the PDCCHs used for repeatedly transmitting DCI belong;

an association relationship between CORESETs to which the PDCCHs used for repeatedly transmitting DCI belong;

an association relationship between aggregation levels of the PDCCHs used for repeatedly transmitting DCI.

The bus architecture may include any numbers of interconnected buses and bridges, and specifically link various circuits of one or more processors represented by the processor 701 and the memory represented by the memory 702. The bus architecture may further link various other circuits such as peripheral device, voltage regulator and power management circuit, which are all well known in the art and thus will not be further described again herein. The bus interface provides an interface. The processor 701 is responsible for managing the bus architecture and general processing, and the memory 702 may store the data used by the processor 701 when performing the operations.

The procedure disclosed by the embodiment of the present application may be applied in the processor 701 or implemented by the processor 701. In the implementation process, each step of the signal processing flow may be completed by the integrated logic circuit of hardware in the processor 701 or the instruction in the form of software. The processor 701 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random-access memory, flash memory, read only memory, programmable read only memory or electrically erasable programmable read only memory, register and other mature storage medium in the art. The storage medium is located in the memory 702, and the processor 701 reads the information in the memory 702 and completes the steps of the signal processing flow in combination with its hardware.

In one embodiment, the processor 701 is configured to read computer instructions in the memory 702 and execute functions implemented on the terminal side.

It should be noted here that the above-mentioned terminal provided in this embodiment of the disclosure can implement all the method steps implemented in the above-mentioned method embodiment. The parts and beneficial effects in this embodiment same as those in the method embodiment will not be described here in detail.

An embodiment of the present application further provides a computer readable storage medium storing computer executable instructions which are configured to cause the computer to execute the method performed by the base station in the above-mentioned embodiments.

An embodiment of the present application further provides a computer readable storage medium storing computer executable instructions which are configured to cause the computer to execute the method performed by the terminal in the above-mentioned embodiments.

The embodiments of the present application can provide methods, systems and computer program products. Thus, the present application can take the form of hardware embodiments alone, software embodiments alone, or embodiments combining the software and hardware aspects. Also, the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which may guide the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus, the instructions executed on the computer or another programmable device provide steps for implementing the functions specified in one or more processes of the flow charts and/or one or more blocks of the block diagrams.

What is claimed is:

1. A method for transmitting control information, comprising:

determining, by a base station, to repeatedly transmit Downlink Control Information (DCI);

transmitting, by the base station, the DCI by carrying the DCI repeatedly on at least two Physical Downlink Control Channels (PDCCHs) used for repeatedly transmitting DCI; wherein the method further comprises:

sending, by the base station, a rule for determining an association relationship between transmission resources to a terminal through a high-layer signaling; wherein the association relationship is an association relationship between transmission resources used for repeatedly transmitting DCI, and the association relationship between transmission resources comprises an association relationship between at least one kind of related information of PDCCHs used for repeatedly transmitting DCI; wherein the association relationship comprises at least one of:

an association relationship between PDCCH candidates to which the PDCCHs used for repeatedly transmitting the DCI belong, wherein the high-layer signaling indicates first Z or last Z PDCCH candidates ranked in order of PDCCH serial numbers in a search space as transmission resources corresponding to the PDCCHs used for repeatedly transmitting the DCI, wherein Z is an agreed value or a configuration value; or an association relationship between search spaces to which the PDCCHs used for repeatedly transmitting the DCI belong, wherein the high-layer signaling indicates first Y or last Y search spaces ranked in order of Control Resource Set (CORESET) serial numbers as transmission resources corresponding to the PDCCHs used for repeatedly transmitting the DCI, wherein Y is an agreed value or a configuration value;

wherein the DCI sent by at least one of the at least two PDCCHs comprises repeated- transmission-resource indication information used to indicate: other PDCCH that repeatedly transmits the DCI in the at least two PDCCHs, or related information of the other PDCCH;

wherein the related information of the other PDCCH indicated by the repeated-transmission-resource indication information comprises at least one of:

a TCI state of a CORESET to which the other PDCCH belongs;

a PDCCH candidate to which the other PDCCH belongs;

a search space to which the other PDCCH belongs;

a CORESET to which the other PDCCH belongs; or an aggregation level of the other PDCCH; and wherein the determining, by a base station, to repeatedly transmit DCI comprises:

determining, by the base station, to repeatedly transmit DCI according to a channel detection situation or feedback of the terminal.

2. The method of claim 1, wherein the at least two PDCCHs used for repeatedly transmitting DCI are from N PDCCH candidates of at least two CORESETs; wherein each of the N PDCCH candidates corresponds to a Transmission Configuration Indicator state (TCI state), and N is an integer greater than 1.

3. The method of claim 1, wherein the base station pre-agrees with the terminal on a rule for determining the association relationship between transmission resources.

4. The method of claim 1, wherein the association relationship further comprises at least one of:

an association relationship between TCI states of CORESETs to which the PDCCHs used for repeatedly transmitting the DCI belong, wherein the high-layer signaling indicates CORESETs corresponding to TCI states of CORESETs with odd CORESET serial numbers as transmission resources corresponding to the PDCCHs used for repeatedly transmitting the DCI, or the high-layer signaling indicates CORESETs corresponding to TCI states of CORESETs with even CORESET serial numbers as transmission resources corresponding to the PDCCHs used for repeatedly transmitting the DCI;

an association relationship between CORESETs to which the PDCCHs used for repeatedly transmitting the DCI belong, wherein the high-layer signaling indicates CORESETs with a remainder of 0 after CORESET serial numbers modulo x as transmission resources corresponding to the PDCCHs used for repeatedly transmitting the DCI, wherein x is an integer greater than 1; or an association relationship between aggregation levels of the PDCCHs used for repeatedly transmitting the DCI, wherein the high-layer signaling indicates PDCCHs corresponding to PDCCH aggregation levels having an appointed multiple relation as the PDCCHs used for repeatedly transmitting the DCI.

5. A base station, comprising:

a processor, a memory and a transceiver;

the transceiver is configured to receive and send data under control of the processor;

the memory is configured to store computer instructions;

the processor is configured to read the computer instructions to perform following operations:

determining to repeatedly transmitting Downlink Control Information (DCI);

carrying the DCI repeatedly on at least two Physical Downlink Control Channels (PDCCHs) used for repeatedly transmitting DCI to send the DCI;

wherein the operations further comprise:

sending a rule for determining an association relationship between transmission resources to a terminal through a high-layer signaling; wherein the association relationship is an association relationship between transmission resources used for repeatedly transmitting DCI, and the association relationship between transmission resources comprises an association relationship between at least one kind of related information of PDCCHs used for repeatedly transmitting DCI; wherein the association relationship comprises at least one of:

an association relationship between PDCCH candidates to which the PDCCHs used for repeatedly transmitting the DCI belong, wherein the high-layer signaling indicates first Z or last Z PDCCH candidates ranked in order of PDCCH serial numbers in a search space as transmission resources corresponding to the PDCCHs used for repeatedly transmitting the DCI, wherein Z is an agreed value or a configuration value; or an association relationship between search spaces to which the PDCCHs used for repeatedly transmitting the DCI belong, wherein the high-layer signaling indicates first Y or last Y search spaces ranked in order of Control Resource Set (CORESET) serial numbers as transmission resources corresponding to the PDCCHs used for repeatedly transmitting the DCI, wherein Y is an agreed value or a configuration value;

wherein the DCI sent by at least one of the at least two PDCCHs comprises repeated-transmission-resource indication information used to indicate: other PDCCH that repeatedly transmits the DCI in the at least two PDCCHs, or related information of the other PDCCH;

wherein the related information of the other PDCCH indicated by the repeated-transmission-resource indication information comprises at least one of:

a TCI state of a CORESET to which the other PDCCH belongs;

a PDCCH candidate to which the other PDCCH belongs;

a search space to which the other PDCCH belongs;

a CORESET to which the other PDCCH belongs; or an aggregation level of the other PDCCH; and wherein the determining, by a base station, to repeatedly transmit DCI comprises:

determining, by the base station, to repeatedly transmit DCI according to a channel detection situation or feedback of the terminal.

6. The base station of claim 5, wherein the at least two PDCCHs used for DCI repeated transmission are from N PDCCH candidates of at least two CORESETs; wherein each of the N PDCCH candidates corresponds to a Transmission Configuration Indicator state (TCI state), and N is an integer greater than 1.

7. The base station of claim 5, wherein the base station pre-agrees with the terminal on a rule for determining the association relationship between transmission resources.

8. The base station of claim 5, wherein the association relationship further comprises at least one of:

an association relationship between TCI states of CORE-SETs to which the PDCCHs used for repeatedly transmitting the DCI belong, wherein the high-layer signaling indicates CORESETs corresponding to TCI states of CORESETs with odd CORESET serial numbers as transmission resources corresponding to the PDCCHs used for repeatedly transmitting the DCI, or the high-layer signaling indicates CORESETs corresponding to TCI states of CORESETs with even CORESET serial numbers as transmission resources corresponding to the PDCCHs used for repeatedly transmitting the DCI;

an association relationship between CORESETs to which the PDCCHs used for repeatedly transmitting the DCI belong, wherein the high-layer signaling indicates CORESETs with a remainder of 0 after CORESET serial numbers modulo x as transmission resources corresponding to the PDCCHs used for repeatedly transmitting the DCI, wherein x is an integer greater than 1; or an association relationship between aggregation levels of the PDCCHs used for repeatedly transmitting the DCI, wherein the high-layer signaling indicates PDCCHs corresponding to PDCCH aggregation levels having an appointed multiple relation as the PDCCHs used for repeatedly transmitting the DCI.

\* \* \* \* \*